(12) United States Patent
Saruwatari

(10) Patent No.: US 7,471,460 B2
(45) Date of Patent: Dec. 30, 2008

(54) ZOOM LENS SYSTEM AND CAMERA HAVING SAME

(75) Inventor: Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/125,640

(22) Filed: May 22, 2008

(65) Prior Publication Data
US 2008/0291547 A1 Nov. 27, 2008

(30) Foreign Application Priority Data
May 24, 2007 (JP) ............................. 2007-137749

(51) Int. Cl.
*G02B 15/14* (2006.01)
(52) U.S. Cl. ...................... 359/687; 359/686
(58) Field of Classification Search ................ 359/686, 359/687, 772, 774
See application file for complete search history.

(56) References Cited

U.S. PATENT DOCUMENTS

| 5,585,966 | A | 12/1996 | Suzuki |
| 5,963,378 | A | 10/1999 | Tochigi |
| 6,016,228 | A | 1/2000 | Uzawa |
| 6,166,864 | A | 12/2000 | Horiuchi |
| 6,456,441 | B2 | 9/2002 | Hoshi |
| 6,751,028 | B1 | 6/2004 | Horiuchi |
| 6,972,909 | B2 | 12/2005 | Hamano |
| 6,975,461 | B2 | 12/2005 | Eguchi |
| 7,190,529 | B2 | 3/2007 | Miyajima |
| 7,206,137 | B2 | 4/2007 | Nakatani |
| 7,420,745 | B2 * | 9/2008 | Ohashi ........................ 359/687 |
| 2006/0140606 | A1 | 6/2006 | Terada |

FOREIGN PATENT DOCUMENTS

| JP | 7-199124 A | 8/1995 |
| JP | 7-270684 A | 10/1995 |
| JP | 10-62687 A | 3/1998 |
| JP | 11-305124 A | 11/1999 |
| JP | 2001-194586 A | 7/2001 |
| JP | 2003-315676 A | 11/2003 |
| JP | 2005-24844 A | 1/2005 |
| JP | 2006-133632 A | 5/2006 |
| JP | 2006-171655 A | 6/2006 |
| JP | 2006-184413 A | 7/2006 |

* cited by examiner

*Primary Examiner*—Timothy J Thompson
(74) *Attorney, Agent, or Firm*—Canon USA Inc IP Div

(57) ABSTRACT

A zoom lens system includes, in order from an object side to an image side, a first lens unit having positive optical power, a second lens unit having negative optical power, a third lens unit having positive optical power, and a fourth lens unit having positive optical power. Each lens unit moves during zooming. In particular, the first lens unit moves so as to be closer to an object at a telephoto end than at a wide-angle end during zooming, and the fourth lens unit moves in a locus convex toward the object side during zooming. The sharing of magnification variation between the third lens unit and the fourth lens unit is appropriately set.

14 Claims, 13 Drawing Sheets

ZOOM LENS SYSTEM AND CAMERA HAVING SAME

BACKGROUND OF THE INVENTION

1. Field of the Invention

The present invention relates to a zoom lens system and a camera having the same.

2. Description of the Related Art

In recent years, digital still cameras having a solid-state image pickup element have become increasingly sophisticated and small. Such cameras require, as a photographing optical system, a zoom lens that is compact yet has a high zoom ratio.

There are known, as zoom lenses meeting such requirements, four-unit zoom lenses each including four lens units consisting of, in order from the object side to the image side, a first lens unit of positive refractive power, a second lens unit of negative refractive power, a third lens unit of positive refractive power, and a fourth lens unit of positive refractive power (Japanese Patent Laid-Open No. 7-270684 corresponding to U.S. Pat. No. 5,963,378, Japanese Patent Laid-Open No. 11-305124 corresponding to U.S. Pat. Nos. 6,166,864 and 6,751,028). In this four-unit zoom lens, the second lens unit is moved to vary magnification, and the fourth lens unit is moved to compensate the image plane variation accompanying the magnification variation and to perform focusing.

In general, it is effective to retract lens units for saving space to store a camera not in use. However, the zoom lenses disclosed in Japanese Patent Laid-Open Nos. 7-270684 and 11-305124, in which the second lens unit has almost all magnification variation functions, are unfit for the retractable structure because the first lens unit and the second lens unit are too sensitive to decentration.

There are also known zoom lenses suitable for the retraction and each including four lens units consisting of, in order from the object side to the image side, a first lens unit of positive refractive power, a second lens unit of negative refractive power, a third lens unit of positive refractive power, and a fourth lens unit of positive refractive power (Japanese Patent Laid-Open No. 10-62687 corresponding to U.S. Pat. No. 6,016,228, Japanese Patent Laid-Open No. 2001-194586 corresponding to U.S. Pat. No. 6,456,441, Japanese Patent Laid-Open No. 2003-315676 corresponding to U.S. Pat. No. 6,975,461, Japanese Patent Laid-Open No. 2005-24844 corresponding to U.S. Pat. No. 6,972,909, Japanese Patent Laid-Open No. 2006-171655 corresponding to U.S. Pat. No. 7,206,137, Japanese Patent Laid-Open No. 2006-184413 corresponding to U.S. Patent Appl. Pub. No. 2006/0140606, and Japanese Patent Laid-Open No. 2006-133632 corresponding to U.S. Pat. No. 7,190,529).

In each of the zoom lenses of Japanese Patent Laid-Open Nos. 10-62687 and 2001-194586, the first lens unit is a single lens, the distances between the lens units are changed to perform zooming, and the fourth lens unit is moved to perform focusing. Therefore, these zoom lenses are simple and suitable for the retractable structure and have a zoom ratio of about 3.

Japanese Patent Laid-Open No. 2003-315676 discloses a zoom lens that performs zooming by moving first, second, third, and fourth lens units and that has a zoom ratio of about 5.

The zoom lens of Japanese Patent Laid-Open No. 2005-24844 is effectively downsized by appropriately selecting lens materials of the second lens unit.

Japanese Patent Laid-Open Nos. 2006-171655, 2006-184413, and 2006-133632 disclose zoom lenses that perform zooming by moving first, second, third, and fourth lens units and that have a high zoom ratio of 10 or more.

In general, to reduce the size of a photographing optical system, the refractive power of each lens unit constituting the photographing optical system is increased, and the number of lenses is reduced. However, a photographing optical system whose refractive power is simply increased is not as compact as expected because the lens thickness increases with the increase in refractive power. In addition, compensation of aberrations becomes difficult.

When lens units of a camera not in use are retracted, errors such as inclination of lenses and lens units are inevitably large due to the mechanical structure. If the lenses and the lens units are sensitive, the optical performance deteriorates and image shake occurs during zooming. Therefore, in a photographing optical system, the sensitivity of the lens and the lens units should be minimized.

SUMMARY OF THE INVENTION

The present invention provides a zoom lens system in which the magnification variation is more appropriately shared among lens units than in known zoom lenses so as to achieve a higher zoom ratio, and whose optical performance in use is less variable despite its retracting mechanism.

In an aspect of the present invention, a zoom lens system includes, in order from an object side to an image side, a first lens unit having positive optical power, a second lens unit having negative optical power, a third lens unit having positive optical power, and a fourth lens unit having positive optical power. Each lens unit moves during zooming.

In particular, the first lens unit moves so as to be closer to an object at a telephoto end than at a wide-angle end during zooming, and the fourth lens unit moves in a locus convex toward the object side during zooming.

The sharing of magnification variation between the third lens unit and the fourth lens unit is appropriately set so that the following conditions are satisfied:

$$0.5 < (\beta 3t \cdot \beta 4w)/(\beta 3w \cdot \beta 4t) < 0.9 \text{ and}$$

$$1.2 < \beta 4t/\beta 4w < 1.4,$$

where $\beta 3w$ is a lateral magnification of the third lens unit at the wide-angle end, $\beta 4w$ is a lateral magnification of the fourth lens unit at the wide-angle end, $\beta 3t$ is a lateral magnification of the third lens unit at the telephoto end, and $\beta 4t$ is a lateral magnification of the fourth lens unit at the telephoto end.

Further features of the present invention will become apparent from the following description of exemplary embodiments with reference to the attached drawings.

DESCRIPTION OF THE EMBODIMENTS

Figure 1:
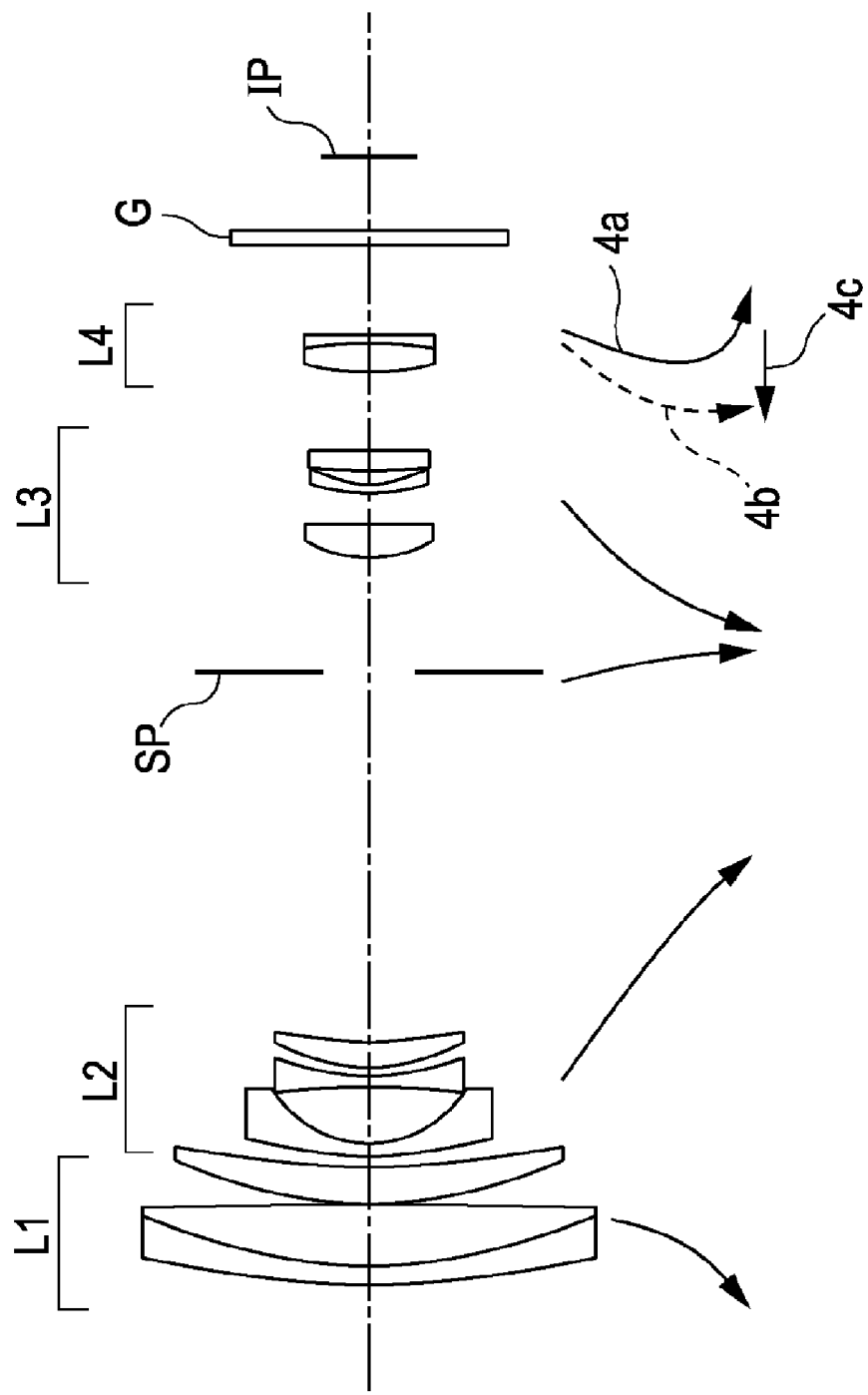
FIG. 1 is a lens sectional view of a zoom lens of Embodiment 1.

The embodiments of a zoom lens system and a camera having the same of the present invention will hereinafter be described.

First, the characterizing portion of a zoom lens system of the present invention will be briefly described.

A zoom lens system of the present invention includes, in order from the object side to the image side, a first lens unit of positive refractive power (optical power=the reciprocal of the focal length), a second lens unit of negative refractive power, a third lens unit of positive refractive power, and a fourth lens unit of positive refractive power, each lens unit moving to perform zooming.

During zooming, the first lens unit moves so as to be closer to the object at the telephoto end than at the wide-angle end, and the fourth lens unit moves in a locus convex toward the object side.

In such a zoom lens system, the sharing of magnification variation between the third lens unit and the fourth lens unit is appropriately set so that the following conditions are satisfied:

$$0.5 < (\beta 3t \cdot \beta 4w)/(\beta 3w \cdot \beta 4t) < 0.9 \quad (1) \text{ and}$$

$$1.2 < \beta 4t/\beta 4w < 1.4 \quad (2),$$

where $\beta 3w$ is the lateral magnification of the third lens unit at the wide-angle end, $\beta 4w$ is the lateral magnification of the fourth lens unit at the wide-angle end, $\beta 3t$ is the lateral magnification of the third lens unit at the telephoto end, and $\beta 4t$ is the lateral magnification of the fourth lens unit at the telephoto end.

This achieves a zoom lens system that has a higher zoom ratio and whose optical performance in use is less variable despite its retracting mechanism.

When $(\beta 3t \cdot \beta 4w)/(\beta 3w \cdot \beta 4t)$ is below the lower limit of the conditional expression (1) and the magnification variation share of the third lens unit is too small, the magnification variation shares of the adjacent lens units are large (in particular, the magnification variation share of the second lens unit is large) and the sensitivity to decentration or image blur is high. As a result, a retracting mechanism is difficult to adopt.

When $(\beta 3t \cdot \beta 4w)/(\beta 3w \cdot \beta 4t)$ exceeds the upper limit of the conditional expression (1), the magnification variation share of the third lens unit L3 is too large, and therefore the number of lenses constituting the third lens unit L3 needs to be increased to compensate aberrations. This makes the downsizing of the lens system difficult.

The conditional expression (2) shows the magnification variation share of the fourth lens unit L4 and is for reducing the aberration variation throughout the zoom region with a small number of lenses.

As well as defining the magnification variation share, the conditional expression (2) is closely related to the moving distance of the fourth lens unit accompanying the zooming. In the case where focusing is performed with the fourth lens unit, the moving distance of the fourth lens unit L4 during focusing can be appropriately restrained by satisfying the conditional expression (2).

The requirements of the zoom lens system of the present invention will be described in detail with reference to the following embodiments.

Figure 2:
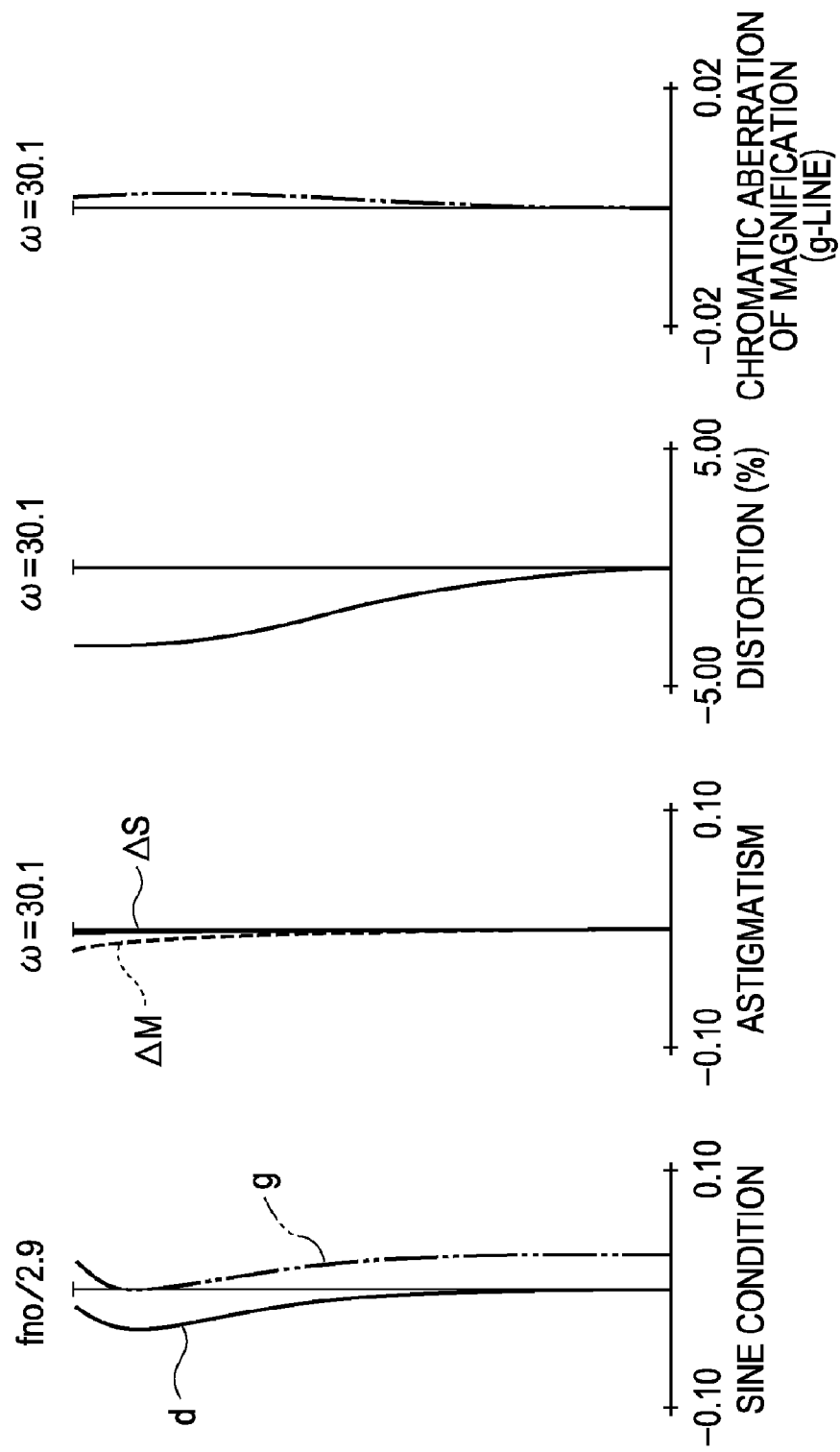
FIG. 2 is an aberration diagram of the zoom lens of Embodiment 1 at the wide-angle end.
Figure 3:
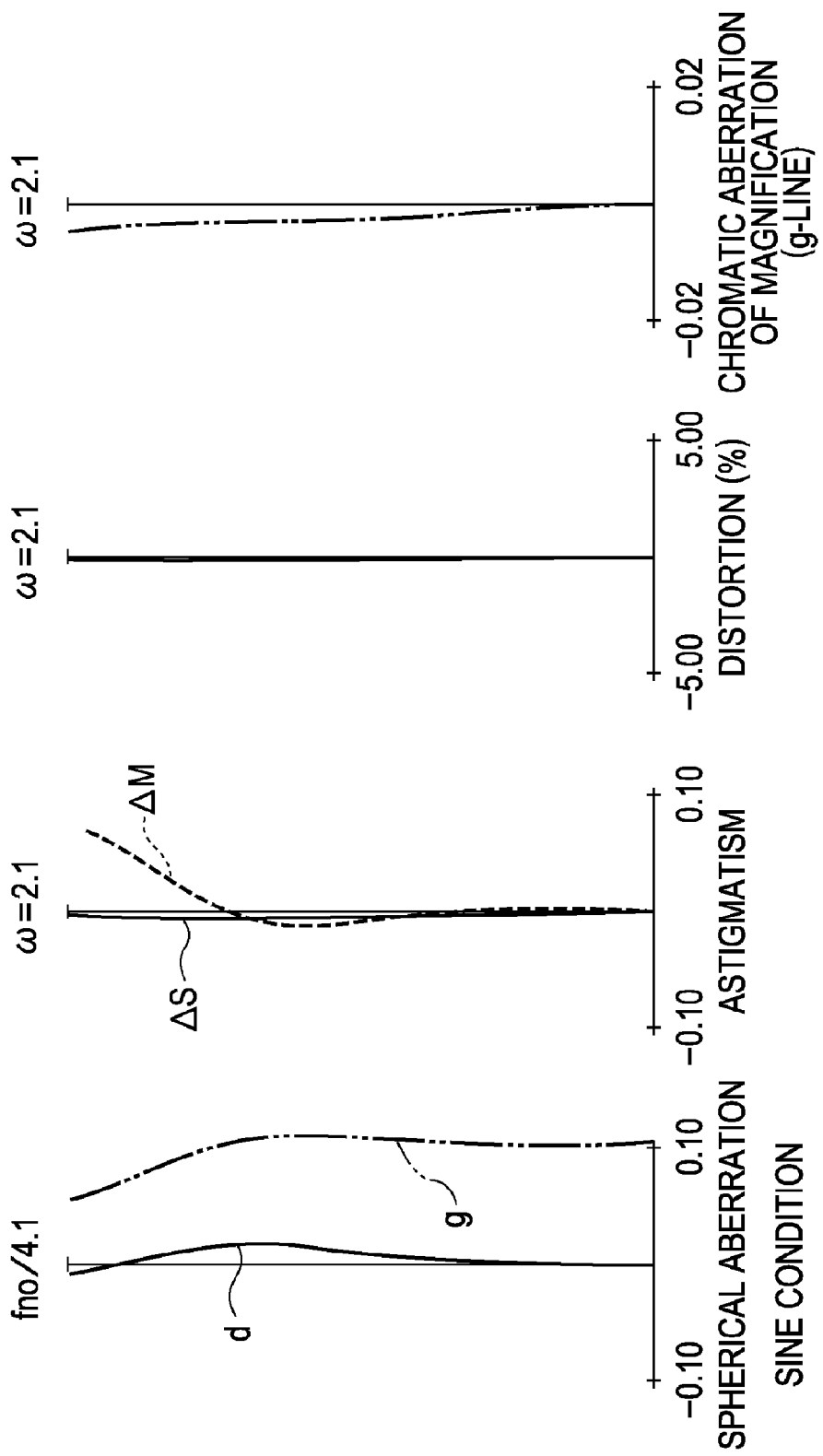
FIG. 3 is an aberration diagram of the zoom lens of Embodiment 1 at the telephoto end.

FIG. 1 is a lens sectional view of a zoom lens of Embodiment 1 at the wide-angle end (short focal length). FIGS. 2 and 3 are aberration diagrams of the zoom lens of Embodiment 1 at the wide-angle end and the telephoto end (long focal length), respectively.

Figure 4:
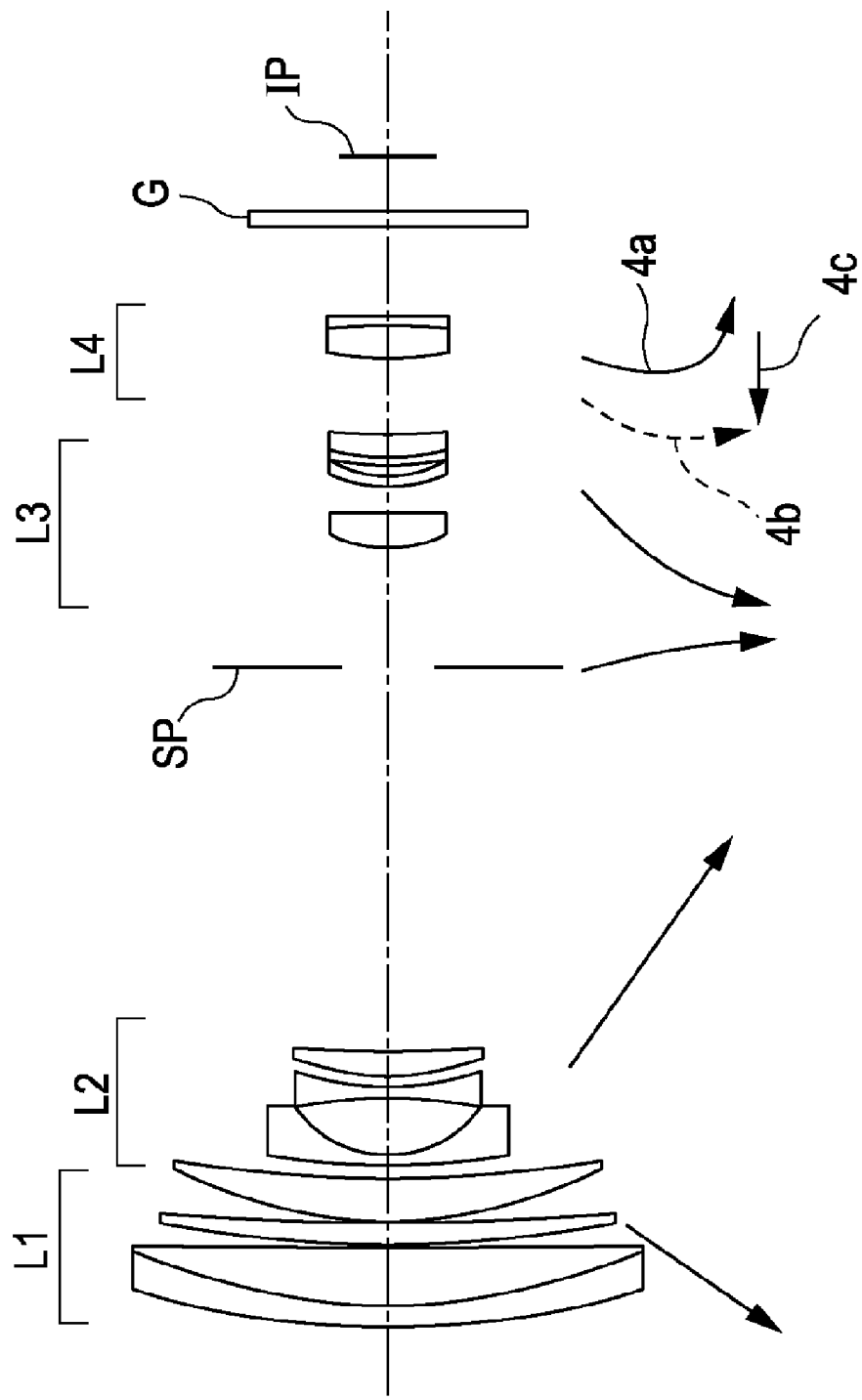
FIG. 4 is a lens sectional view of a zoom lens of Embodiment 2.
Figure 5:
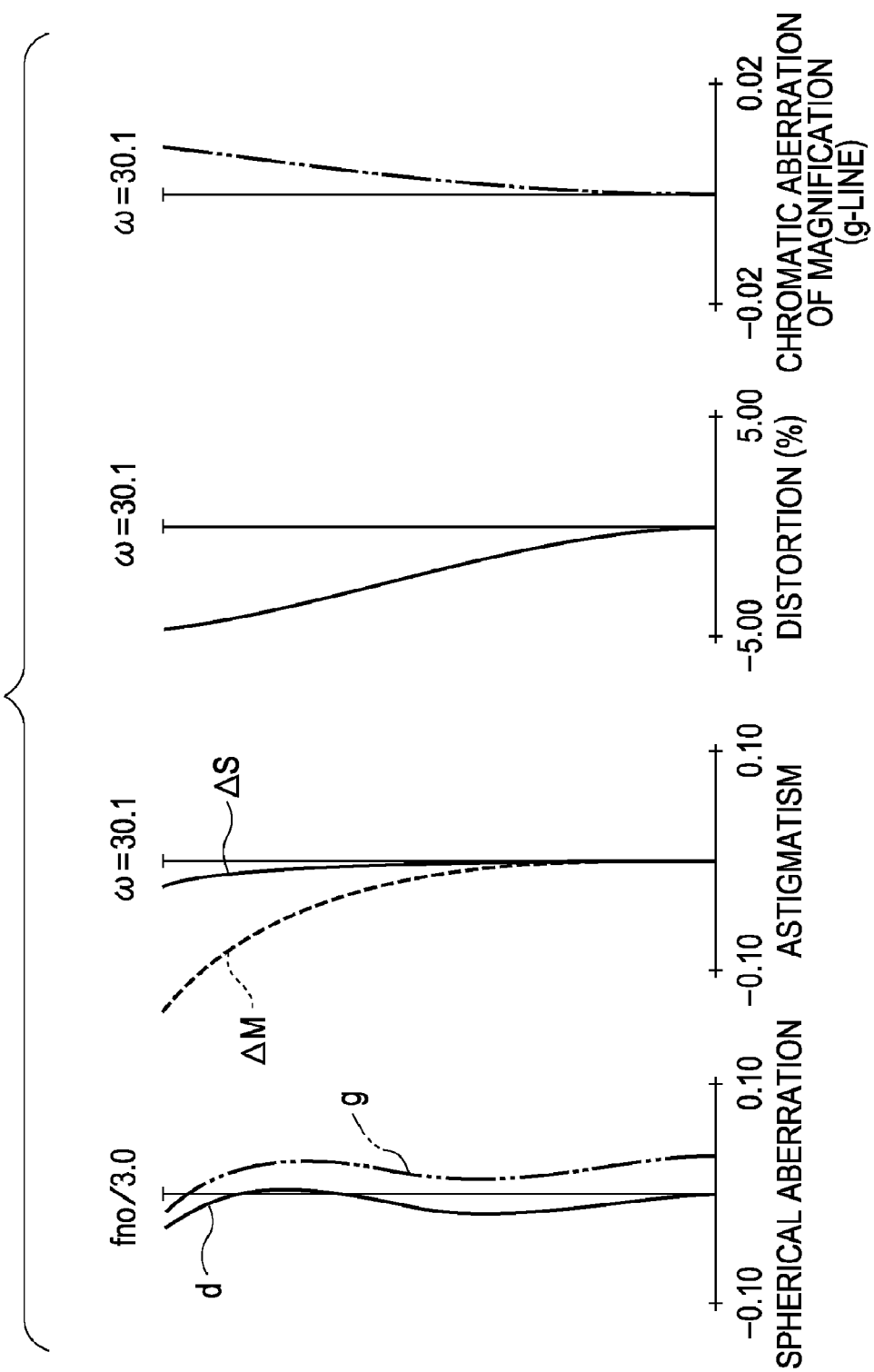
FIG. 5 is an aberration diagram of the zoom lens of Embodiment 2 at the wide-angle end.
Figure 6:
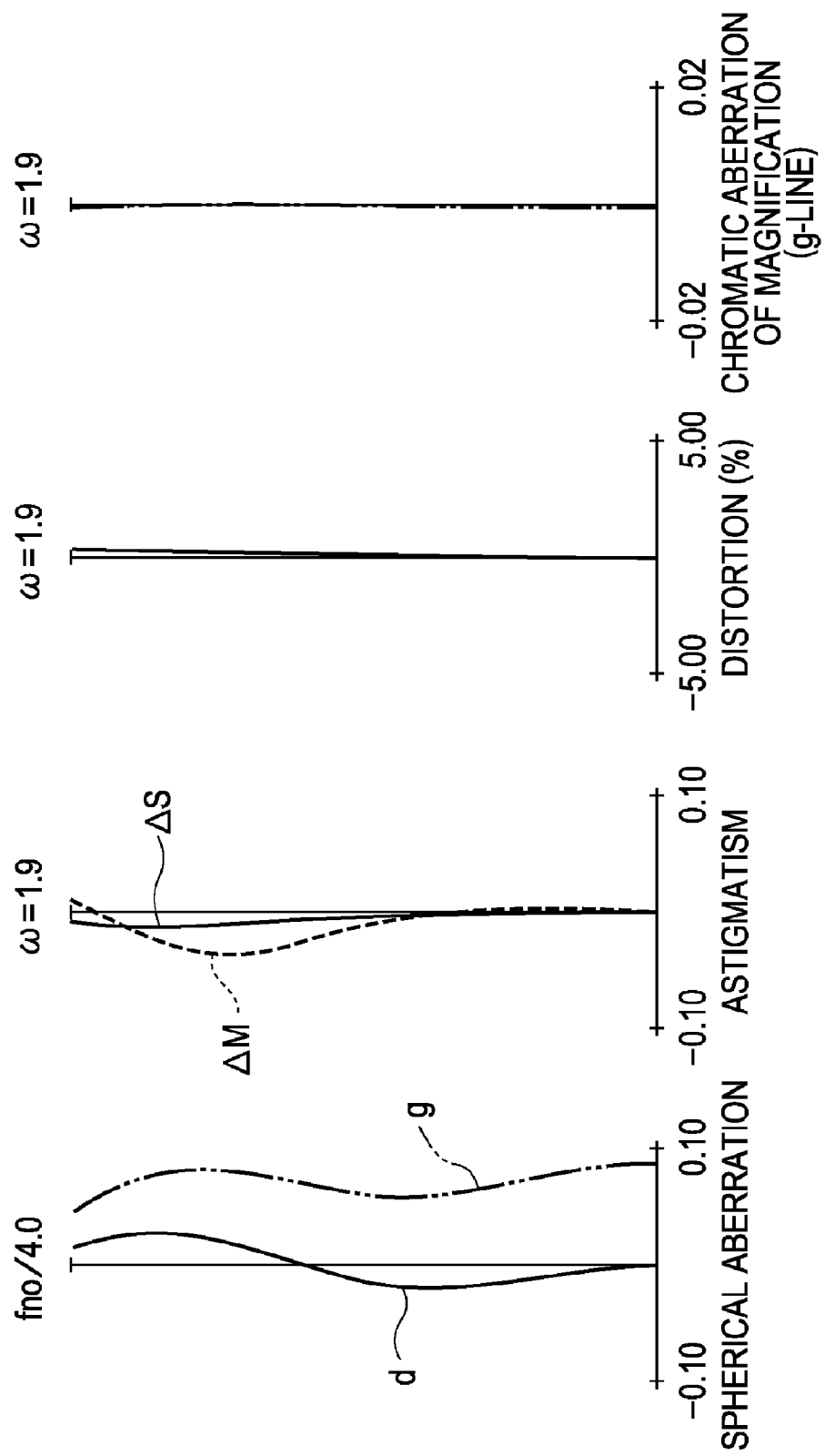
FIG. 6 is an aberration diagram of the zoom lens of Embodiment 2 at the telephoto end.

FIG. 4 is a lens sectional view of a zoom lens of Embodiment 2 at the wide-angle end. FIGS. 5 and 6 are aberration diagrams of the zoom lens of Embodiment 2 at the wide-angle end and the telephoto end, respectively.

Figure 7:
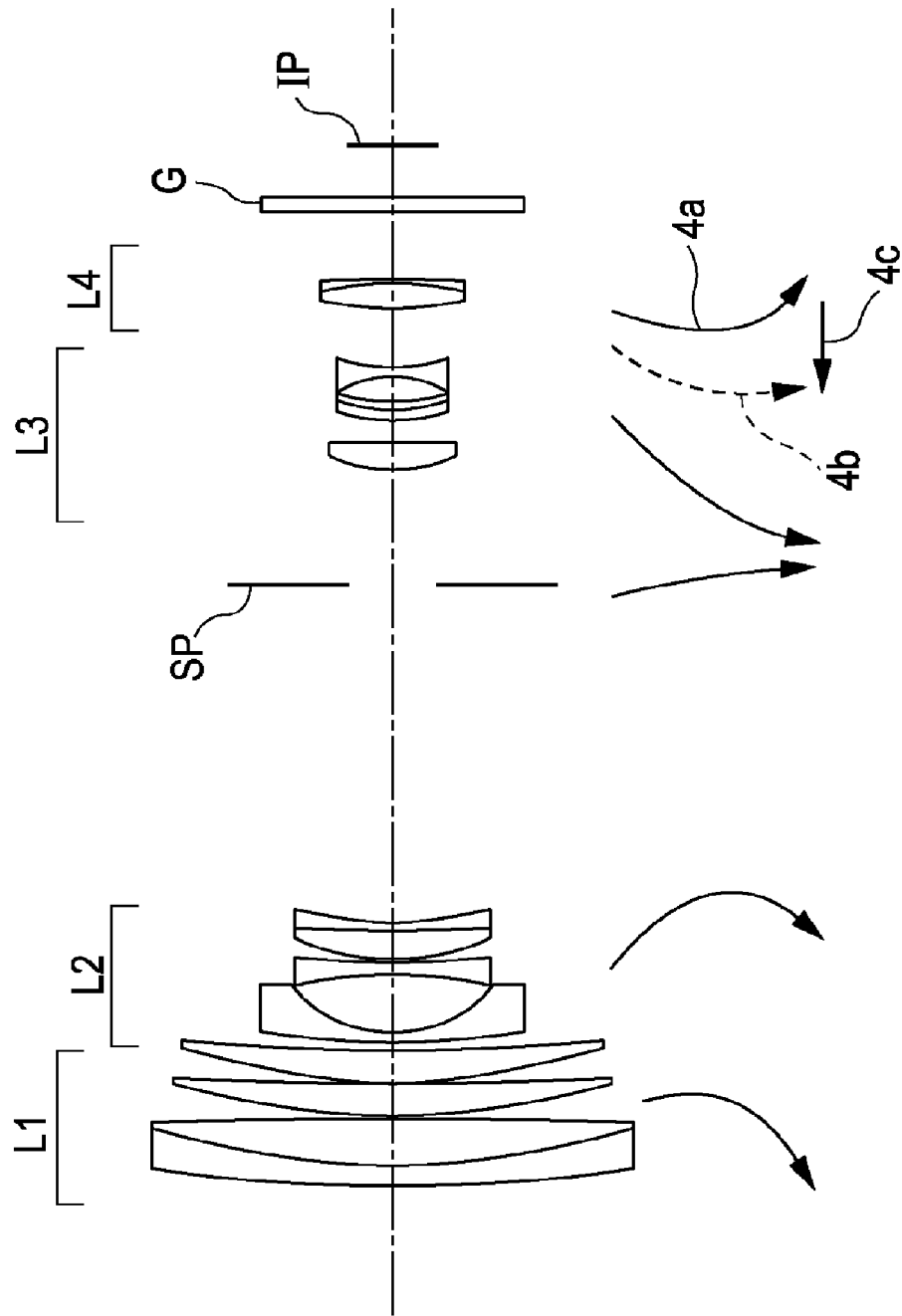
FIG. 7 is a lens sectional view of a zoom lens of Embodiment 3.
Figure 8:
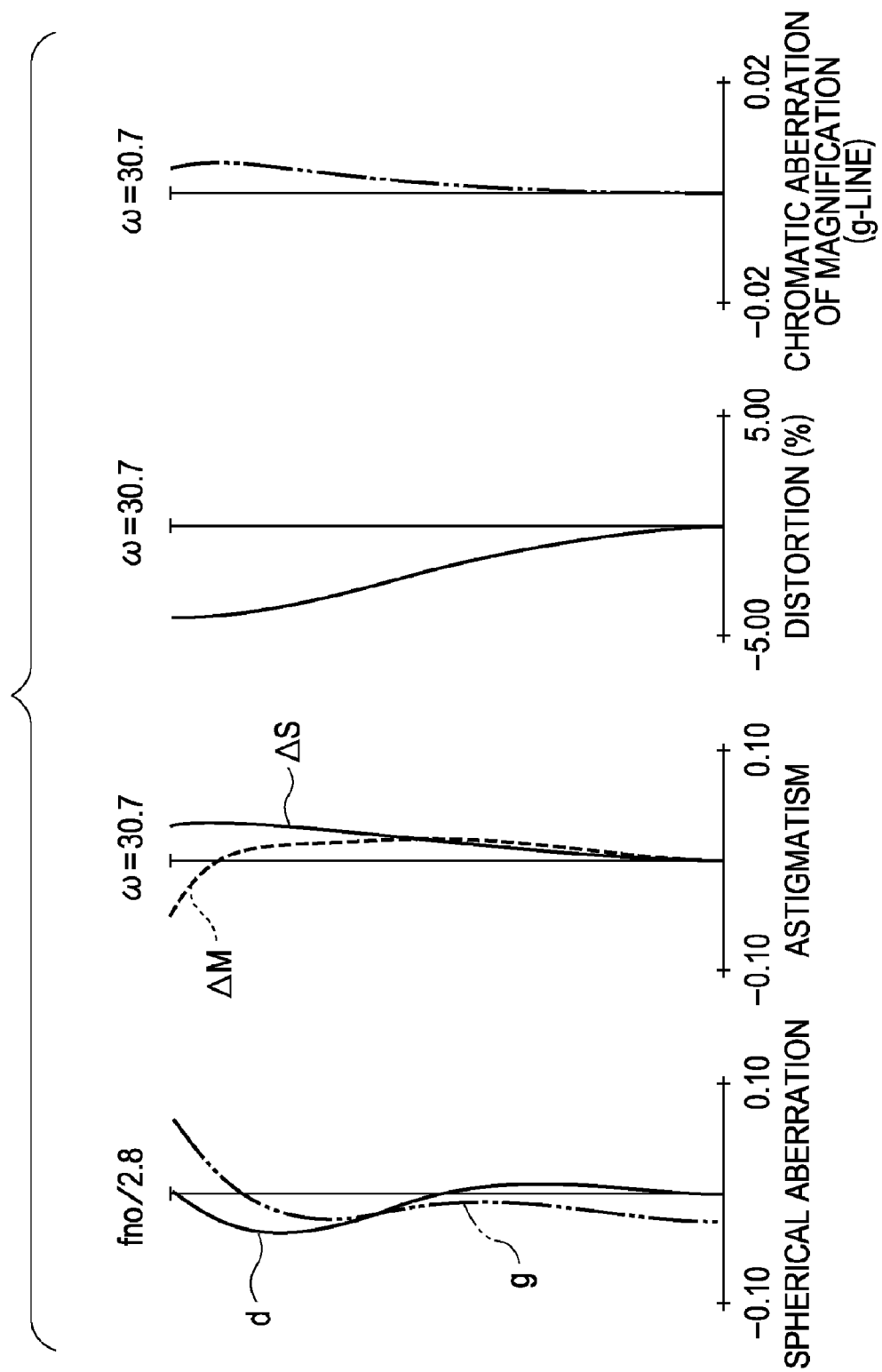
FIG. 8 is an aberration diagram of the zoom lens of Embodiment 3 at the wide-angle end.
Figure 9:
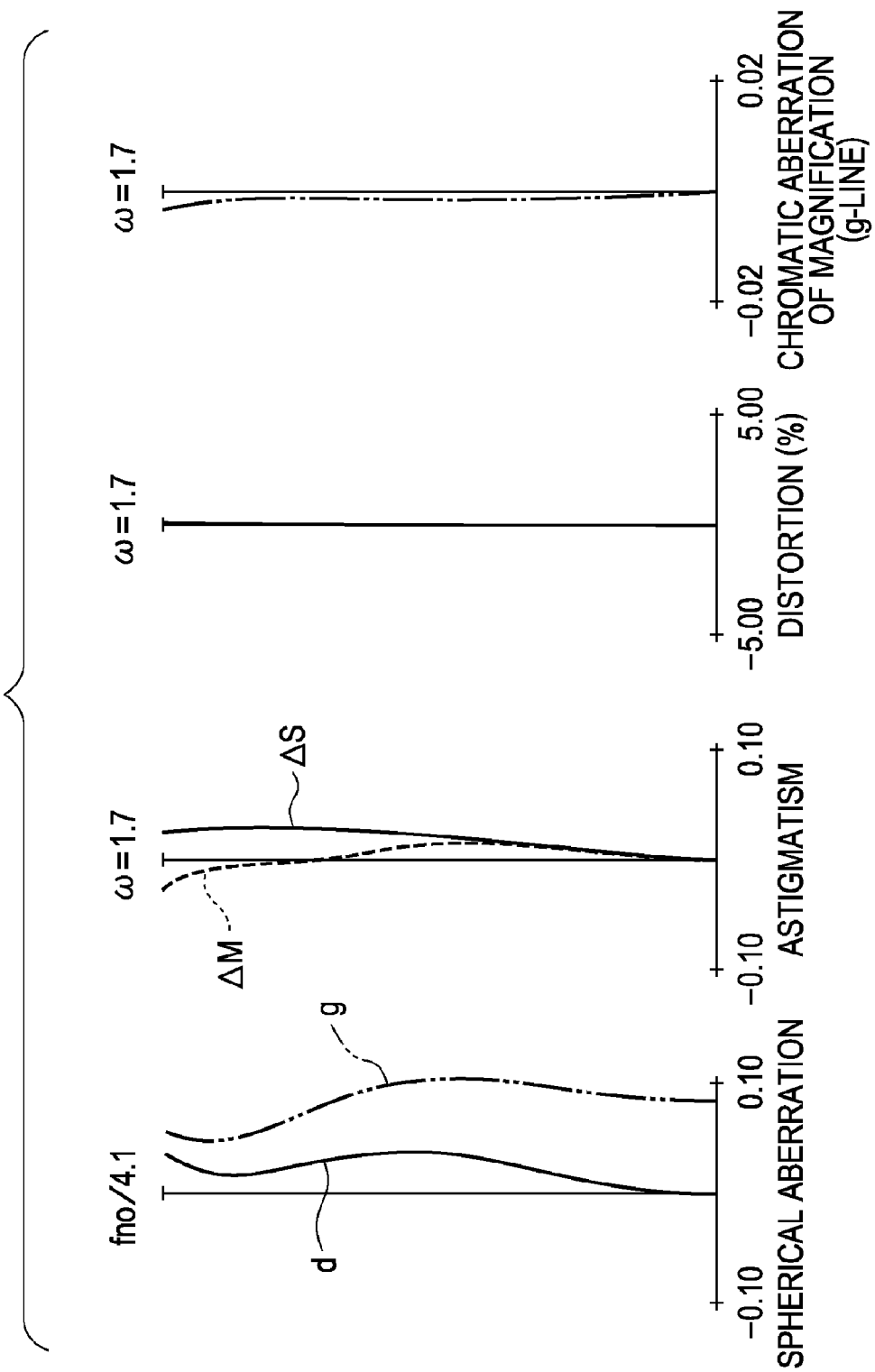
FIG. 9 is an aberration diagram of the zoom lens of Embodiment 3 at the telephoto end.

FIG. 7 is a lens sectional view of a zoom lens of Embodiment 3 at the wide-angle end. FIGS. 8 and 9 are aberration diagrams of the zoom lens of Embodiment 3 at the wide-angle end and the telephoto end, respectively.

Figure 10:
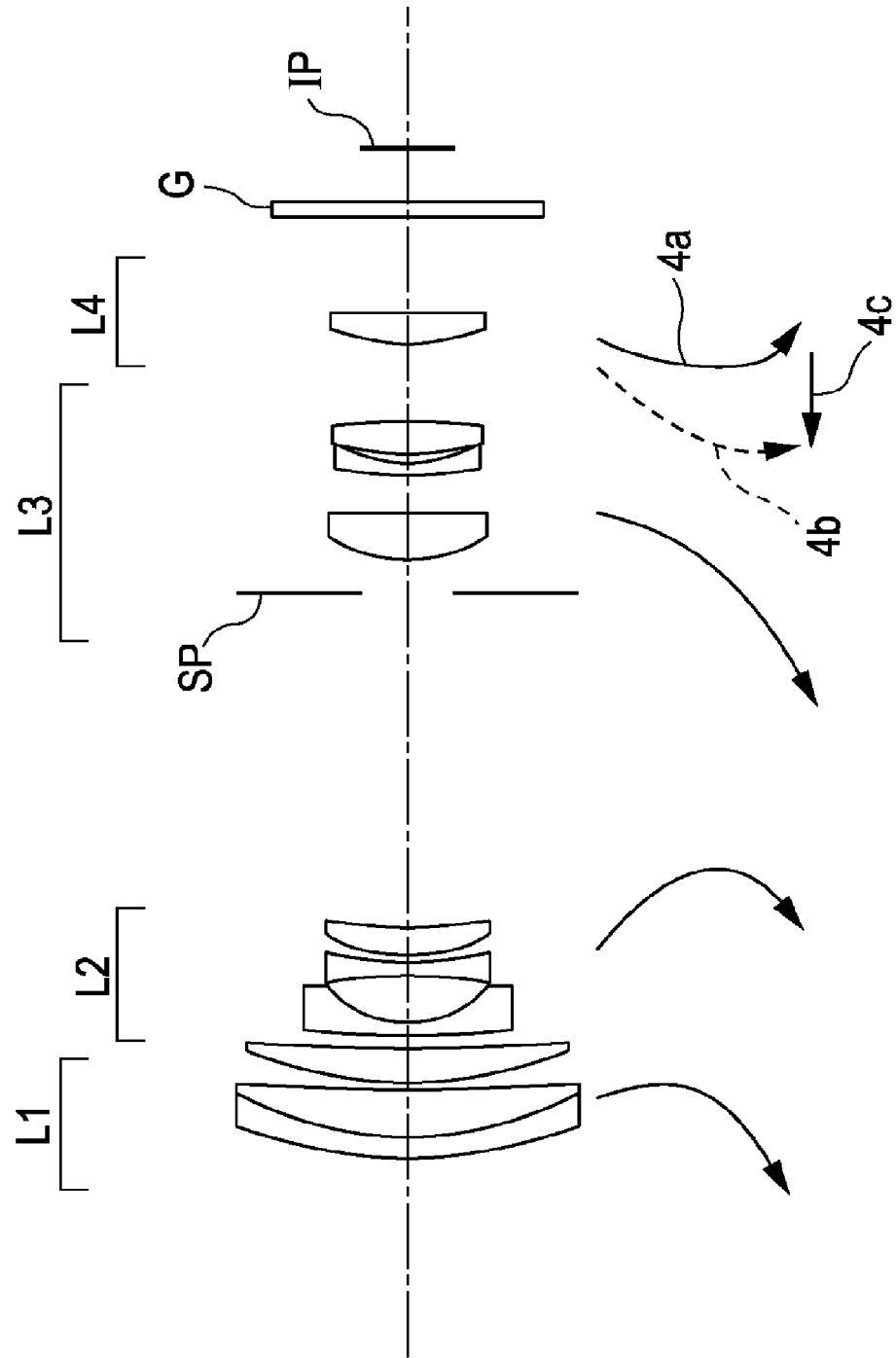
FIG. 10 is a lens sectional view of a zoom lens of Embodiment 4.
Figure 11:
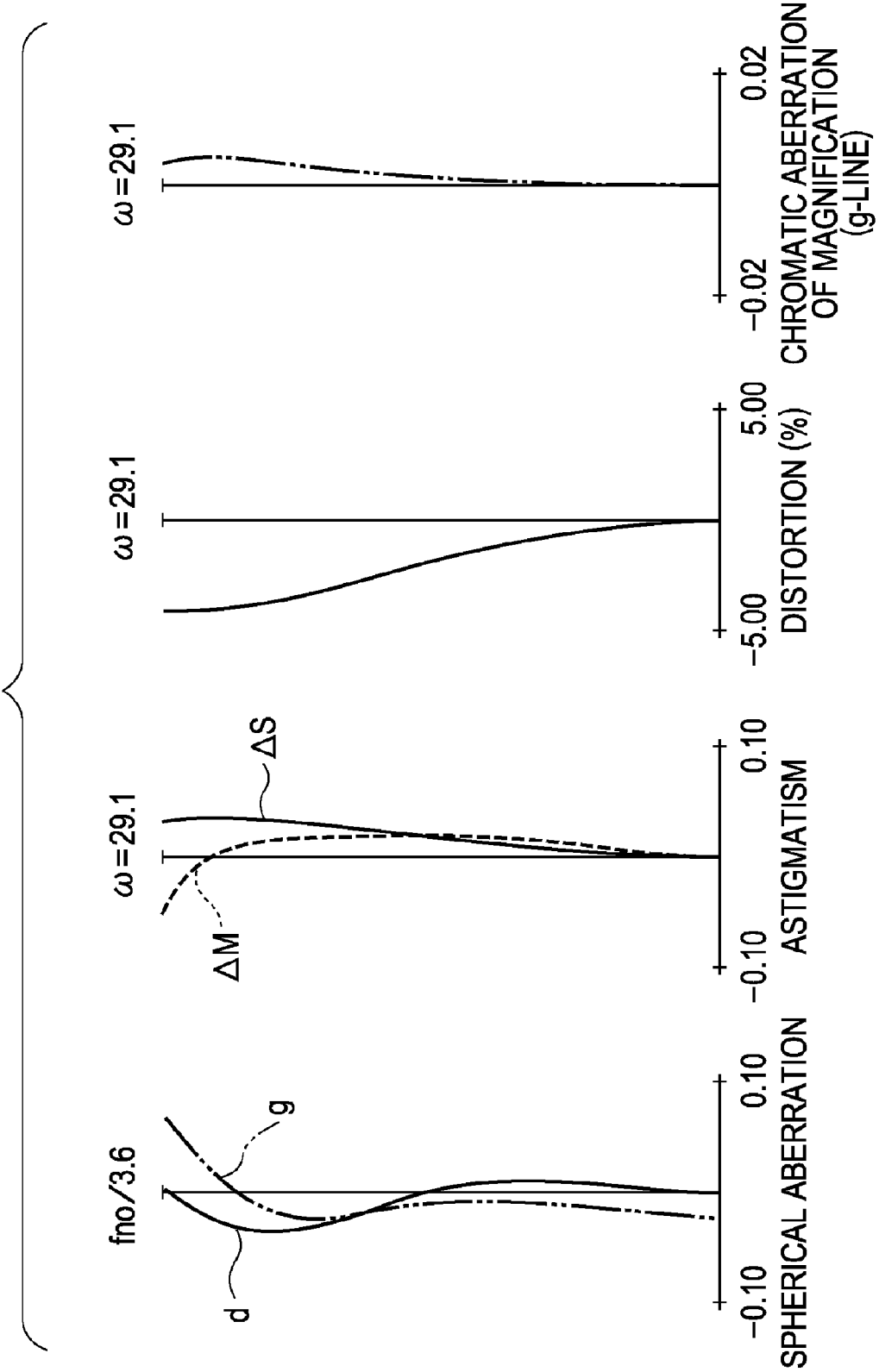
FIG. 11 is an aberration diagram of the zoom lens of Embodiment 4 at the wide-angle end.
Figure 12:
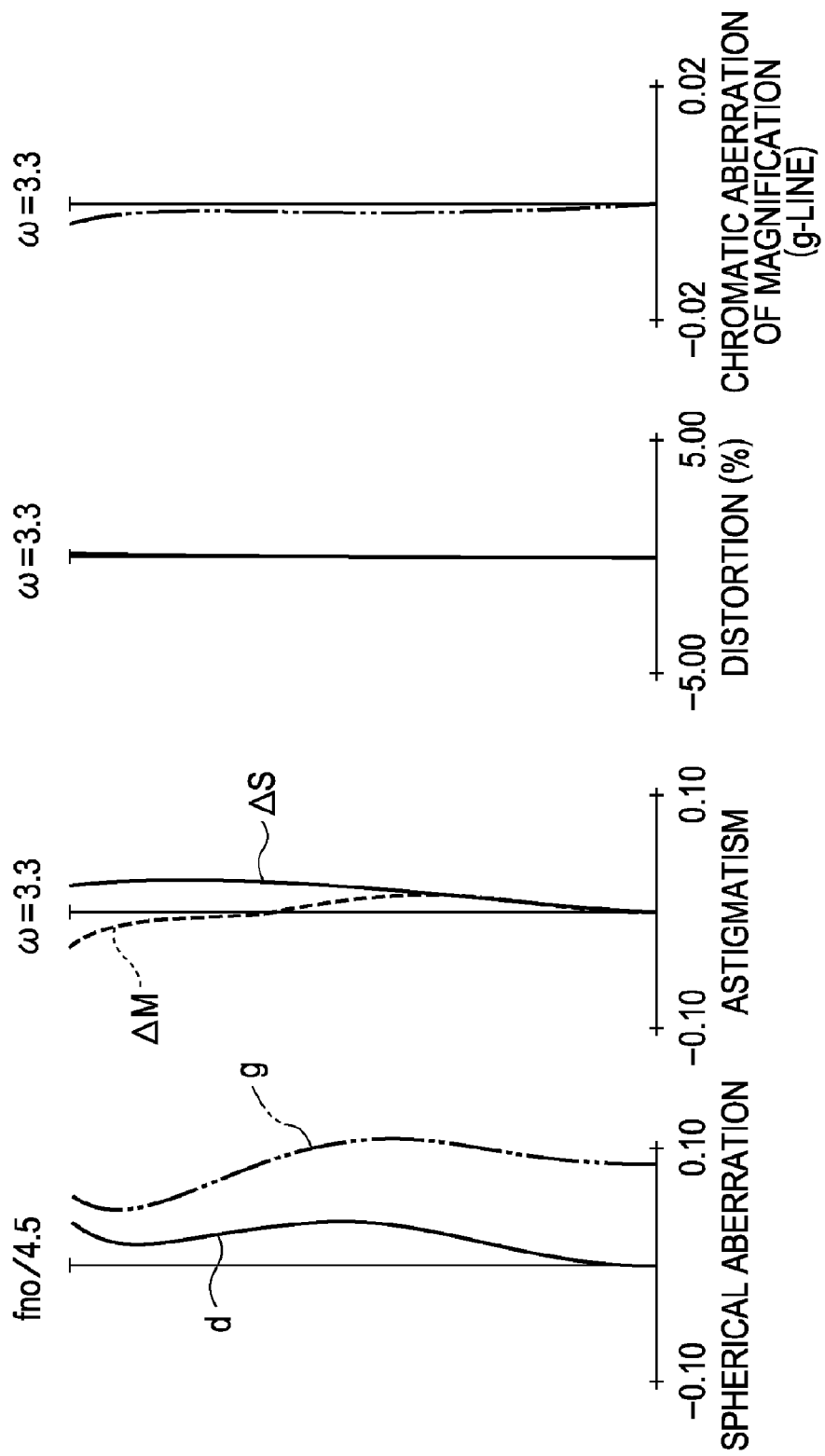
FIG. 12 is an aberration diagram of the zoom lens of Embodiment 4 at the telephoto end.

FIG. 10 is a lens sectional view of a zoom lens of Embodiment 4 at the wide-angle end. FIGS. 11 and 12 are aberration diagrams of the zoom lens of Embodiment 4 at the wide-angle end and the telephoto end, respectively.

Figure 13:
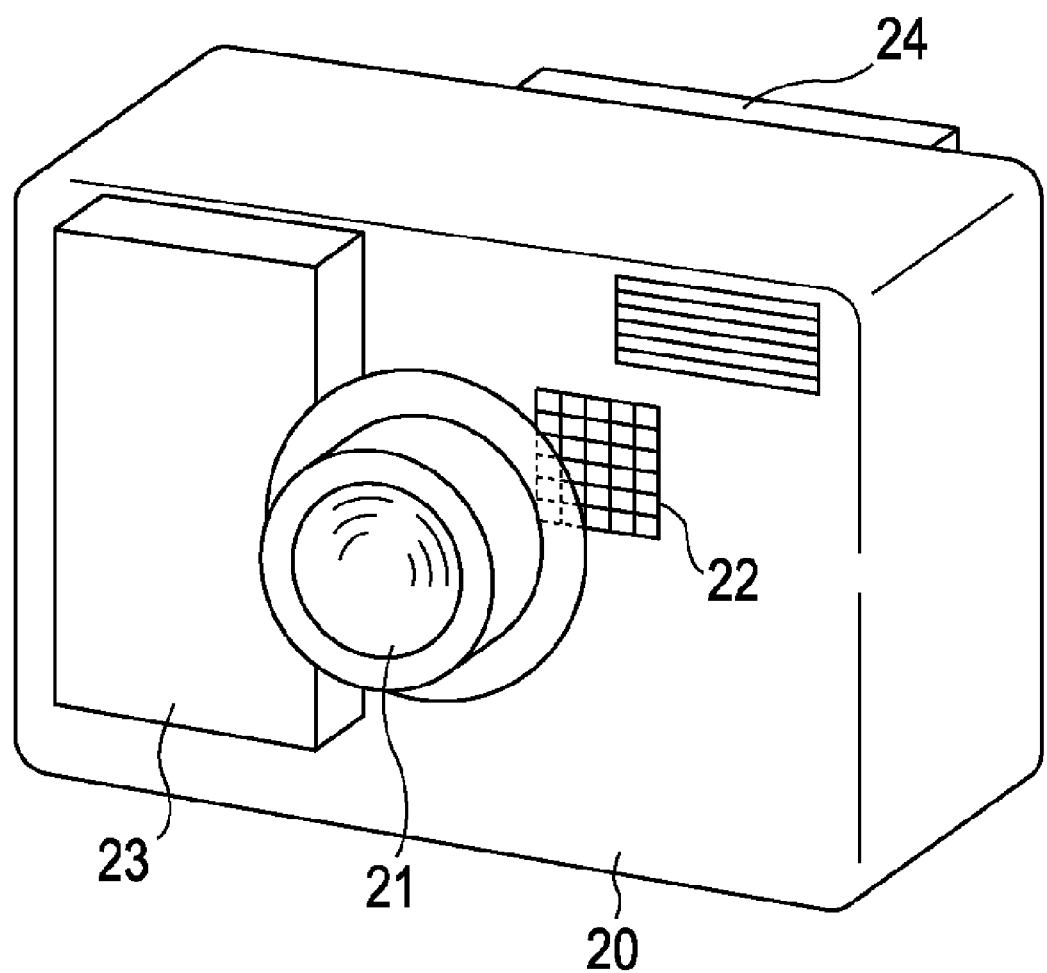
FIG. 13 is a schematic view of a camera.

FIG. 13 is a schematic view of a camera (image pickup apparatus) having a zoom lens system of the present invention. The zoom lens of each embodiment is a photographing lens system used in image pickup apparatuses such as video cameras, digital cameras, and silver-halide film cameras.

In the lens sectional views, the left side is the object side (the front side), and the right side is the image side (the rear side).

In the lens sectional views, reference letter L1 denotes a first lens unit of positive refractive power, reference letter L2 denotes a second lens unit of negative refractive power, reference letter L3 denotes a third lens unit of positive refractive power, and reference letter L4 denotes a fourth lens unit of positive refractive power.

Reference letter SP denotes an aperture stop, which is disposed on the object side of the third lens unit L3.

Reference letter G denotes an optical block corresponding, for example, to an optical filter, a face plate, a crystal low-pass filter, or an infrared cut filter.

Reference letter IP denotes an image plane. When the zoom lens of each embodiment is used as a photographing optical system of a video camera or a digital still camera, the image plane IP corresponds to the image pickup plane of a solid-state image pickup element (photoelectric conversion element) such as a CCD sensor or a CMOS sensor. When the zoom lens of each embodiment is used as a photographing optical system of a silver-halide film camera, the image plane IP corresponds to the film plane.

In the aberration diagrams, reference letters d and g denote the d-line and the g-line, respectively. Reference letters $\Delta M$ and $\Delta S$ denote the meridional image plane and the sagittal image plane, respectively. The chromatic aberration of magnification is indicated by the g-line with reference to the d-line. Reference letter $\omega$ denotes the half field angle. Reference letter fno denotes the F-number.

In each of the following embodiments, the wide-angle end and the telephoto end refer to the zooming positions where the lens units for magnification variation are located at either end of their mechanically movable ranges on the optical axis.

In each embodiment, during zooming from the wide-angle end to the telephoto end, the lens units are moved as shown by arrows.

Specifically, during zooming from the wide-angle end to the telephoto end, the first lens unit L1 is moved to the object side, the second lens unit L2 is moved to the image side, and the third lens unit L3 is moved to the object side. The fourth lens unit L4 is moved in a locus convex toward the object side.

The first lens unit L1 and the third lens unit L3 are moved so as to be closer to the object at the telephoto end than at the wide-angle end. Due to this, a high zoom ratio is achieved without increasing the overall length of the zoom lens at the wide-angle end.

In particular, in each embodiment, the third lens unit L3 is moved to the object side during zooming so that the third lens unit L3 and the fourth lens unit L4 bear appropriate shares of magnification variation. In addition, the first lens unit L1 of positive refractive power is moved to the object side so that the second lens unit L2 has a great magnification variation effect. Due to this, a high zoom ratio is achieved without significantly increasing the refractive powers of the first lens unit L1 and the second lens unit L2.

The zoom lens of each embodiment is of a rear focus type in which the fourth lens unit L4 is moved on the optical axis to perform focusing.

In the case of focusing from an object at infinity to an object at a close distance at the telephoto end, the fourth lens unit L4 is moved forward as shown by an arrow 4c in each lens sectional view. The solid curve 4a and the dashed curve 4b concerning the fourth lens unit L4 show moving loci for compensating the image plane variation accompanying the magnification variation from the wide-angle end to the telephoto end during focusing on an object at infinity and an object at a close distance, respectively.

In each embodiment, the fourth lens unit L4, which is lightweight, is moved for focusing, and thereby quick focusing is facilitated, for example, autofocusing can be performed quickly.

In each embodiment, the third lens unit L3 is moved so as to have a component in a direction perpendicular to the optical axis to compensate the position of a photographed image when the whole optical system shakes. That is, image blur (variation in the position of the image plane) is compensated.

Therefore, image stabilizing is performed without adding an optical member, such as a variable apex angle prism, and a lens unit for image stabilizing. Therefore, the whole optical system is prevented from increasing in size.

In each of Embodiments 1 to 3, the aperture stop SP moves independently from the third lens unit L3 during zooming. Therefore, the entrance pupil position in the wide field angle region is disposed on the object side so that the front lens diameter (the effective diameter of the first lens unit) does not increase.

In Embodiments 4, the aperture stop SP moves integrally with the third lens unit L3 during zooming. Moving the aperture stop SP integrally with the third lens unit L3 simplifies the mechanism.

In every embodiment, the aperture stop SP is moved during zooming. However, the aperture stop SP may be stationary during zooming. In the case where the aperture stop SP is stationary, the aperture unit need not be moved. Therefore, during zooming, the drive torque of a driving actuator can be set small, and the electric power is saved.

Next, the characteristics of the lens configuration of each lens unit will be described.

The effective lens diameter of the first lens unit L1 is larger than those of the other lens units. Therefore, the number of lenses of the first lens unit L1 should be small for weight saving. However, in order to secure a high zoom ratio and perform excellent aberration compensation, a certain number of lenses is necessary.

Therefore, the first lens unit L1 is configured to include, from the object side to the image side, a negative meniscus lens element with a convex surface at the object side, a positive lens element, and a positive lens element.

Specifically, in each of Embodiments 1 and 4, the first lens unit L1 includes a cemented lens, consisting of a negative lens element and a positive lens element, and a single positive lens element. Therefore, the spherical aberration and chromatic aberration, which significantly occur when the zoom ratio is high, are excellently compensated with a minimum number of lenses.

In each of Embodiments 2 and 3, the first lens unit L1 consists of four lens elements. Compared to Embodiments 1 and 4, a positive lens element is added on the image side. Due to this, the spherical aberration occurring in the first lens unit L1 and other remaining aberrations are restrained. In addition, the aberration variation during focusing that increases in the telephoto region, especially the variation in chromatic aberration, is restrained.

In each of Embodiments 1, 2, and 4, the second lens unit L2 consists of three independent single lens elements, that is, a negative meniscus lens element with a convex surface at the object side, a biconcave negative lens element, and a positive lens element with a convex surface at the object side.

Due to this, the aberration variation during zooming is reduced. In particular, the distortion at the wide-angle end and the spherical aberration at the telephoto end are excellently compensated.

In the second lens unit L2 of Embodiment 3, an additional negative lens element is provided on the image side of a positive lens element corresponding to the positive lens element of the second lens unit L2 of each of Embodiments 1, 2, and 4. By cementing this negative lens element and the positive lens element on the object side thereof, the variation in chromatic aberration throughout the zoom region is restrained.

The third lens unit L3 is configured to have two positive lens elements and a negative lens element independent from each other.

In each embodiment, the third lens unit L3 is configured to include two positive lens elements and a negative lens element with a concave surface at the image side. Reducing the principal point distance between the second lens unit L2 and the third lens unit L3 reduces the length of the part of the zoom lens behind the third lens unit L3.

The third lens unit L3 has one or more aspherical surfaces. Thereby, the aberration variation accompanying the zooming is excellently compensated.

In each of Embodiments 2 and 3, a cemented lens is used in the third lens unit L3, and the variation in chromatic aberration during zooming is thereby restrained. In addition, when the third lens unit L3 is moved to perform image stabilizing, aberrations due to decentration are reduced. The specific lens configuration of the third lens unit L3 is as follows.

In each of Embodiments 1 and 4, the third lens unit L3 includes, in order from the object side to the image side, a positive lens element with a convex surface at the object side, a negative meniscus lens element with a convex surface at the object side, and a biconvex positive lens element.

In Embodiment 2, the third lens unit L3 includes, in order from the object side to the image side, a positive lens element with a convex surface at the object side, a negative meniscus lens element with a convex surface at the object side, and a cemented lens consisting of a negative meniscus lens element with a convex surface at the object side and a positive lens element.

In Embodiment 3, the third lens unit L3 includes, in order from the object side to the image side, a positive lens element with a convex surface at the object side, a negative meniscus lens element with a convex surface at the object side, and a cemented lens consisting of a biconvex positive lens element and a biconcave negative lens element.

The fourth lens unit L4 is a single positive lens element with a convex surface at the object side, or a cemented lens consisting of a positive lens element and a negative lens element.

The above-described lens configuration in each embodiment achieves a high-zoom-ratio yet being compact and a high-performance zoom lens.

In each embodiment, the above-described conditional expressions (1) and (2) are satisfied. More preferable conditions for solving various technical problems in a zoom lens will hereinafter be described.

The focal length fm is defined as:

$$fm = \sqrt{(fw \cdot ft)},$$

where fw is the focal length of the zoom lens system at the wide-angle end, and ft is the focal length of the zoom lens system at the telephoto end.

The following condition should be satisfied:

$$0.35 < (|Mwm| + |Mwt|)/f3 < 0.60 \tag{3},$$

where Mwm is the moving distance of the fourth lens unit L4 on the optical axis from the wide-angle end to the focal length fm, Mwt is the moving distance of the fourth lens unit L4 from the wide-angle end to the telephoto end, and f3 is the focal length of the third lens unit L3.

The term "moving distance" here refers to an amount of change in the position of a lens unit relative to a standard that is stationary during zooming (for example, an image plane) at a zoom position (for example, the wide-angle end or the telephoto end).

The sign convention used here is such that the movement toward the image side is positive.

In the case where a lens unit moves in a convex or concave locus, the term "moving distance" refers to the distance between the position before the movement and the position after the movement. Therefore, when a lens unit reciprocates completely, that is, when the position before the movement is the same as the position after the movement, the moving distance is zero.

Next, the technical meaning of the conditional expression will be described.

The conditional expression (3) defines the ratio of the moving distance of the fourth lens unit L4 accompanying the zooming to the focal length of the third lens unit L3.

As described above, the third lens unit L3 and the fourth lens unit L4 share the magnification variation. Therefore, when the focal length of the third lens unit L3 is long, the magnification variation share of the third lens unit L3 is insufficient. Therefore, the moving distance of the fourth lens unit L4 needs to be increased to obtain a high zoom ratio. When an increased focal length of the third lens unit L3 makes (|Mwm|+|Mwt|)/f3 fall below the lower limit of the conditional expression (3), the moving distance of the fourth lens unit L4 needs to be increased to obtain a high zoom ratio.

Consequently, in order to avoid the physical interference with the adjacent lens unit and glass block, the overall length of the zoom lens needs to be increased. When a decreased focal length of the third lens unit L3 makes (|Mwm|+|Mwt|)/f3 exceed the upper limit of the conditional expression (3), the number of lenses constituting the third lens unit L3 needs to be increased to restrain the aberration variation during zooming. This makes it difficult to downsize the whole zoom lens system.

The following condition should be satisfied:

$$1.0 < |Mwm/Mwt| < 3.0 \tag{4},$$

where Mwm is the moving distance of the fourth lens unit L4 on the optical axis from the wide-angle end to the focal length fm, and Mwt is the moving distance of the fourth lens unit L4 from the wide-angle end to the telephoto end.

With the increase in zoom ratio, at the telephoto end, the total moving distance of the fourth lens unit L4 during focusing increases. When, at the wide-angle end, the balance between the moving distance toward the object side and the moving distance toward the image side of the fourth lens unit L4 during focusing is appropriate, the retracted length can be made shorter.

When |Mwm/Mwt| is below the lower limit of the conditional expression (4), the moving distance of the fourth lens unit L4 toward the image side is large. At the telephoto end, the fourth lens unit L4 and the member on the image side thereof (the glass block G in each embodiment) tend to interfere with each other.

At the telephoto end, since the distance between the third lens unit L3 moved toward the object side and the fourth lens unit L4 cannot be utilized, the efficiency is low in terms of the retracted length.

When |Mwm/Mwt| exceeds the upper limit of the conditional expression (4), the moving distance of the fourth lens unit L4 toward the object side is large, and therefore the mechanical interference with the third lens unit L3 tends to occur in the middle zoom region.

The following condition should be satisfied:

$$0.08 < (L3t - L3w)/ft < 0.20 \tag{5},$$

where L3w is the axial distance between the third lens unit L3 and the fourth lens unit L4 (the axial distance between the most image-side lens surface of the third lens unit L3 and the most object-side lens surface of the fourth lens unit L4) at the wide-angle end, and L3t is the axial distance between the third lens unit L3 and the fourth lens unit L4 at the telephoto end.

The conditional expression (5) shows the ratio of the change in the axial distance between the third lens unit L3 and the fourth lens unit L4 during zooming to the focal length of the whole system at the telephoto end.

When (L3t−L3w)/ft is below the lower limit of the conditional expression (5), the change in the distance between the lens units necessary for zooming to obtain a desired zoom ratio cannot be secured. Significantly changing the distance between the lens units so that (L3t−L3w)/ft exceeds the upper limit of the conditional expression (5) is advantageous to achieving a higher zoom ratio but increases the overall length of the zoom lens at the telephoto end. In addition, the retracting mechanism needs to have a more complex structure such as multi-stage retraction.

The following condition should be satisfied:

$$0.01 < |M3|/ft < 0.15 \tag{6},$$

where M3 is the moving distance of the third lens unit L3 in the optical axis direction from the wide-angle end to the telephoto end.

The conditional expression (6) shows the ratio of the moving distance of the third lens unit L3 to the focal length of the whole system at the telephoto end.

When |M3|/ft is below the lower limit of the conditional expression (6), the position of the third lens unit L3 at the wide-angle end is substantially the same as the position of the third lens unit L3 at the telephoto end. Therefore, the third lens unit L3 and the fourth lens unit L4 may mechanically interfere with each other in the middle zoom region where the fourth lens unit L4 is closest to the object.

To avoid this, the overall length of the zoom lens needs to be increased. This makes it difficult to downsize the whole lens system.

When |M3|/ft exceeds the upper limit of the conditional expression (6), the increased moving distance of the third lens unit L3 during zooming makes it difficult to reduce the retracted length.

The zoom lens of Embodiments 1 to 4 satisfies every one of the above-described conditional expressions (3) to (6). However, not every conditional expression has to be satisfied. When one of the conditional expressions is satisfied, an advantage corresponding to the conditional expression is obtained.

In each embodiment, to excellently compensate aberrations, to reduce the aberration variation during zooming, and to achieve a higher zoom ratio, the numerical range of each conditional expression should be set as follows:

$$0.6 < (\beta 3t \cdot \beta 4w)/(\beta 3w \cdot \beta 4t) < 0.9 \quad (1a),$$

$$1.2 < \beta 4t/\beta 4w < 1.39 \quad (2a),$$

$$0.35 < (|Mwm| + |Mwt|)/f3 < 0.55 \quad (3a),$$

$$1.0 < |Mwm/Mwt| < 2.6 \quad (4a),$$

$$0.08 < (L3t - L3w)/ft < 0.18 \quad (5a), \text{ and}$$

$$0.03 < |M3|/ft < 0.12 \quad (6a).$$

As described above, appropriately setting the moving distance of each lens unit during zooming and the refractive power of each lens unit achieves a high-zoom-ratio yet compact and high-optical-performance zoom lens.

In particular, a zoom lens having excellent optical performance throughout the zoom range from the wide-angle end to the telephoto end can be achieved.

Next, the following are Numerical Embodiments 1 to 4 corresponding to Embodiments 1 to 4, respectively. In each numerical embodiment, numbers (i) denote the order of optical surfaces from the object side. Reference letter ri denotes the radius of curvature of the i-th optical surface (i-th surface). Reference letter di denotes the distance between the i-th surface and the (i+1)th surface. Reference letter ni denotes the refractive index of the material of the i-th optical member for the d-line. Reference letter vi denotes the Abbe number of the material of the i-th optical member for the d-line expressed by the following expression:

$$vi = (Nd - 1)/(NF - NC),$$

where Nd is the refractive index at the wavelength of the d-line (587.6 nm), NF is the refractive index at the wavelength of the F-line (486.1 nm), and NC is the refractive index at the wavelength of the C-line (656.3 nm).

An aspherical shape is defined by the following expression:

$$x = (h^2/R)/[1 + [1 - (1+k)(h/R)^2]^{1/2}] + Bh^4 + Ch^6 + Dh^8 + Eh^{10} + A'h^3 + B'h^5 + C'h^7,$$

where x is an amount of displacement from a surface vertex in the optical axis direction at a height h from the optical axis; k is a conic constant; B, C, D, E, A', B', and C' are aspherical coefficients; and R is a paraxial radius of curvature.

In addition, "E–Z" means "$10^{-Z}$." Reference letter f denotes the focal length, reference letter Fno denotes the F-number, and reference letter ω denotes the half field angle.

In each numerical embodiment, the last two planes constitute an optical block G.

Table 1 shows the numerical values related to the above conditional expressions in each numerical embodiment.

| Numerical Embodiment 1 f = 6.15-97.98 Fno = 2.9-4.1 2ω = 60.2-4.2 | | | |
|---|---|---|---|
| r1 = 68.113 | d1 = 1.50 | n1 = 1.84666 | v1 = 23.9 |
| r2 = 38.242 | d2 = 4.70 | n2 = 1.49700 | v2 = 81.5 |
| r3 = −333.296 | d3 = 0.20 | | |
| r4 = 33.311 | d4 = 2.90 | n3 = 1.77250 | v3 = 49.6 |
| r5 = 80.760 | d5 = Variable | | |
| r6 = 33.934 | d6 = 0.90 | n4 = 1.83400 | v4 = 37.2 |
| r7 = 7.983 | d7 = 4.63 | | |
| r8 = −30.515 | d8 = 0.75 | n5 = 1.60311 | v5 = 60.6 |
| r9 = 19.354 | d9 = 0.70 | | |
| r10 = 15.051 | d10 = 2.00 | n6 = 1.92286 | v6 = 18.9 |
| r11 = 38.855 | d11 = Variable | | |
| r12 = (Stop) | d12 = Variable | | |
| r13 = 10.436 | d13 = 2.70 | n7 = 1.58313 | v7 = 59.4 |
| r14 = −615.005 | d14 = 2.30 | | |
| r15 = 15.238 | d15 = 0.70 | n8 = 1.84666 | v8 = 23.9 |
| r16 = 8.845 | d16 = 1.00 | | |
| r17 = 30.888 | d17 = 1.60 | n9 = 1.48749 | v9 = 70.2 |
| r18 = −735.916 | d18 = Variable | | |
| r19 = 24.381 | d19 = 2.50 | n10 = 1.69680 | v10 = 55.5 |
| r20 = −21.354 | d20 = 0.60 | n11 = 1.84666 | v11 = 23.9 |
| r21 = −69.580 | d21 = Variable | | |
| r22 = ∞ | d22 = 1.31 | n12 = 1.49831 | v12 = 65.1 |
| r23 = ∞ | | | |

| Focal Length | | |
|---|---|---|
| 6.15 | 24.55 | 97.98 |

| | | | |
|---|---|---|---|
| d5 | 0.80 | 22.44 | 35.80 |
| d11 | 28.48 | 12.16 | 2.17 |
| d12 | 9.20 | 2.60 | 1.20 |
| d18 | 6.02 | 5.51 | 17.34 |
| d21 | 7.00 | 12.27 | 2.00 |

Aspherical Surface (13th Surface)  k = −9.36678E−1
B = 1.12855E−4  C = 3.76314E−5
D = 4.77251E−7  E = −1.18621E−9
A' = −5.37150E−5  B' = −1.01902E−4  C' = −6.62779E−6

| Numerical Embodiment 2 f = 6.15-109.96 Fno = 3.0-4.0 2ω = 60.2-3.7 | | | |
|---|---|---|---|
| r1 = 68.287 | d1 = 1.50 | n1 = 1.84666 | v1 = 23.9 |
| r2 = 44.710 | d2 = 4.70 | n2 = 1.49700 | v2 = 81.5 |
| r3 = 623.378 | d3 = 0.30 | | |
| r4 = 91.599 | d4 = 1.60 | n3 = 1.77250 | v3 = 49.6 |
| r5 = 160.052 | d5 = 0.20 | | |
| r6 = 34.785 | d6 = 3.40 | n4 = 1.49700 | v4 = 81.5 |

-continued

Numerical Embodiment 2
f = 6.15-109.96 Fno = 3.0-4.0 2ω = 60.2-3.7

| | | | |
|---|---|---|---|
| r7 = 105.130 | d7 = Variable | | |
| r8 = 49.420 | d8 = 0.90 | n5 = 1.83400 | ν5 = 37.2 |
| r9 = 8.536 | d9 = 4.49 | | |
| r10 = −26.201 | d10 = 0.75 | n6 = 1.60311 | ν6 = 60.6 |
| r11 = 21.304 | d11 = 0.70 | | |
| r12 = 16.948 | d12 = 2.00 | n7 = 1.92286 | ν7 = 18.9 |
| r13 = 58.009 | d13 = Variable | | |
| r14 = (Stop) | d14 = Variable | | |
| r15 = 9.515 | d15 = 2.70 | n8 = 1.58313 | ν8 = 59.4 |
| r16 = −117.934 | d16 = 2.00 | | |
| r17 = 12.504 | d17 = 0.70 | n9 = 1.84666 | ν9 = 23.9 |
| r18 = 7.616 | d18 = 1.00 | | |
| r19 = 39.033 | d19 = 0.60 | n10 = 1.69895 | ν10 = 30.1 |
| r20 = 21.794 | d20 = 1.80 | n11 = 1.69680 | ν11 = 55.5 |
| r21 = 80.416 | d21 = Variable | | |
| r22 = 28.957 | d22 = 2.50 | n12 = 1.69680 | ν12 = 55.5 |
| r23 = −24.521 | d23 = 0.60 | n13 = 1.84666 | ν13 = 23.9 |
| r24 = −68.461 | d24 = Variable | | |
| r25 = ∞ | d25 = 1.31 | n14 = 1.49831 | ν14 = 65.1 |
| r26 = ∞ | | | |

Focal Length

| | 6.15 | 26.01 | 109.96 |
|---|---|---|---|
| d7 | 0.80 | 25.83 | 39.93 |
| d13 | 30.14 | 14.90 | 1.96 |
| d14 | 9.20 | 0.63 | 0.60 |
| d21 | 6.02 | 2.65 | 15.76 |
| d24 | 7.00 | 13.33 | 2.01 |

Aspherical Surface

| | |
|---|---|
| (15th Surface) | k = −5.68222E−1 |
| | B = 9.26543E−5 C = 3.63693E−5 |
| | D = 5.22658E−7 E = −1.37030E−9 |
| | A' = −3.91795E−5 B' = −1.01902E−4 C' = −6.61099E−6 |

Numerical Embodiment 3
f = 6.00-120.93 Fno = 2.8-4.1 2ω = 61.4-3.38

| | | | |
|---|---|---|---|
| r1 = 118.987 | d1 = 1.90 | n1 = 1.80610 | ν1 = 33.3 |
| r2 = 53.373 | d2 = 4.70 | n2 = 1.49700 | ν2 = 81.5 |
| r3 = −713.012 | d3 = 0.20 | | |
| r4 = 53.370 | d4 = 3.00 | n3 = 1.48749 | ν3 = 70.2 |
| r5 = 193.537 | d5 = 0.20 | | |
| r6 = 44.559 | d6 = 3.20 | n4 = 1.49700 | ν4 = 81.5 |
| r7 = 154.144 | d7 = Variable | | |
| r8 = 62.562 | d8 = 1.00 | n5 = 1.80518 | ν5 = 25.4 |
| r9 = 9.299 | d9 = 5.80 | | |
| r10 = −25.687 | d10 = 0.80 | n6 = 1.48749 | ν6 = 70.2 |
| r11 = 27.891 | d11 = 0.50 | | |
| r12 = 16.408 | d12 = 2.90 | n7 = 1.92286 | ν7 = 18.9 |
| r13 = 114.627 | d13 = 0.70 | n8 = 1.69680 | ν8 = 55.5 |
| r14 = 23.221 | d14 = Variable | | |
| r15 = (Stop) | d15 = Variable | | |
| r16 = 9.803 | d16 = 2.70 | n9 = 1.58313 | ν9 = 59.4 |
| r17 = −300.576 | d17 = 2.20 | | |
| r18 = 12.275 | d18 = 0.80 | n10 = 1.83400 | ν10 = 37.2 |
| r19 = 7.823 | d19 = 0.80 | | |
| r20 = 11.453 | d20 = 2.70 | n11 = 1.49700 | ν11 = 81.5 |
| r21 = −5.932 | d21 = 0.60 | n12 = 1.51742 | ν12 = 52.4 |
| r22 = 9.778 | d22 = Variable | | |
| r23 = 17.812 | d23 = 2.40 | n13 = 1.69680 | ν13 = 55.5 |
| r24 = −20.056 | d24 = 0.60 | n14 = 1.84666 | ν14 = 23.9 |
| r25 = −61.559 | d25 = Variable | | |
| r26 = ∞ | d26 = 1.90 | n15 = 1.51633 | ν15 = 64.1 |
| r27 = ∞ | | | |

-continued

Numerical Embodiment 3
f = 6.00-120.93 Fno = 2.8-4.1 2ω = 61.4-3.38

Focal Length

| | 6.00 | 26.94 | 120.93 |
|---|---|---|---|
| d7 | 0.80 | 25.34 | 41.97 |
| d14 | 32.87 | 12.32 | 3.03 |
| d15 | 11.15 | 2.84 | 1.48 |
| d22 | 5.74 | 5.79 | 19.06 |
| d25 | 6.30 | 13.75 | 3.34 |

Aspherical Surface

| | |
|---|---|
| (16th Surface) | k = −6.45277E−1 |
| | B = 6.98883E−5 C = 1.12058E−6 |
| | D = −4.34773E−7 E = 3.75475E−9 |
| | A' = −6.91627E−5 B' = −2.89004E−5 C' = 2.19195E−6 |

Numerical Embodiment 4
f = 6.45-62.49 Fno = 3.6-4.5 2ω = 58.2-6.58

| | | | |
|---|---|---|---|
| r1 = 34.653 | d1 = 1.10 | n1 = 1.80518 | ν1 = 25.4 |
| r2 = 21.011 | d2 = 3.30 | n2 = 1.48749 | ν2 = 70.2 |
| r3 = 157.005 | d3 = 0.20 | | |
| r4 = 25.463 | d4 = 2.40 | n3 = 1.69680 | ν3 = 55.5 |
| r5 = 133.767 | d5 = Variable | | |
| r6 = 48.988 | d6 = 0.80 | n4 = 1.83481 | ν4 = 42.7 |
| r7 = 6.736 | d7 = 3.16 | | |
| r8 = −25.619 | d8 = 0.70 | n5 = 1.60311 | ν5 = 60.6 |
| r9 = 17.810 | d9 = 0.70 | | |
| r10 = 12.524 | d10 = 1.60 | n6 = 1.92286 | ν6 = 18.9 |
| r11 = 30.726 | d11 = Variable | | |
| r12 = (Stop) | d12 = 2.20 | | |
| r13 = 8.346 | d13 = 3.00 | n7 = 1.58313 | ν7 = 59.4 |
| r14 = −54.067 | d14 = 2.40 | | |
| r15 = 19.899 | d15 = 0.70 | n8 = 1.84666 | ν8 = 23.9 |
| r16 = 7.302 | d16 = 0.70 | | |
| r17 = 17.482 | d17 = 2.00 | n9 = 1.48749 | ν9 = 70.2 |
| r18 = −69.188 | d18 = Variable | | |
| r19 = 13.589 | d19 = 2.00 | n10 = 1.48749 | ν10 = 70.2 |
| r20 = −150.386 | d20 = Variable | | |
| r21 = ∞ | d21 = 0.50 | n11 = 1.51680 | ν11 = 64.2 |
| r22 = ∞ | | | |

Focal Length

| | 6.45 | 20.08 | 62.49 |
|---|---|---|---|
| d6 | 0.80 | 12.49 | 21.81 |
| d11 | 21.64 | 7.44 | 1.88 |
| d18 | 5.16 | 5.27 | 14.88 |
| d20 | 7.00 | 11.78 | 4.03 |

Aspherical Surface

| | |
|---|---|
| (13th Surface) | k = −8.98867E−1 |
| | B = 1.12203E−4 C = 4.28112E−5 |
| | D = 5.83984E−7 E = 4.57312E−9 |
| | A' = −7.08295E−5 B' = −9.93962E−5 C' = −8.66169E−6 |

TABLE 1

| Conditional Expression | Embodiment 1 | Embodiment 2 | Embodiment 3 | Embodiment 4 |
|---|---|---|---|---|
| (1) | 0.62 | 0.73 | 0.67 | 0.89 |
| (2) | 1.34 | 1.25 | 1.38 | 1.22 |
| (3) | 0.42 | 0.5 | 0.38 | 0.43 |
| (4) | 1.05 | 1.27 | 2.52 | 1.62 |
| (5) | 0.12 | 0.09 | 0.11 | 0.16 |
| (6) | 0.06 | 0.04 | 0.09 | 0.11 |

Next, an embodiment of a digital still camera in which a zoom lens according to any one of the embodiments serves as a photographing optical system will be described with reference to FIG. 13.

In FIG. 13, reference numeral 20 denotes a main body of a camera, and reference numeral 21 denotes a photographing optical system that is a zoom lens according to any one of Embodiments 1 to 4. Reference numeral 22 denotes a solid-state image pickup element (photoelectric conversion element), such as a CCD sensor or a CMOS sensor, that is housed in the main body of the camera and that detects an object image formed by the photographing optical system 21. Reference numeral 23 denotes a memory that records information corresponding to the object image photoelectrically converted by the solid-state image pickup element 22. Reference numeral 24 denotes a finder that is, for example, a liquid crystal display panel and that is used for observing an object image formed on the solid-state image pickup element 22.

By thus applying a zoom lens system of the present invention to an image pickup apparatus such as a digital still camera, an image pickup apparatus that is small and that has high optical performance can be achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-137749 filed May 24, 2007, which is hereby incorporated by reference herein in its entirety.

What is claimed is:

1. A zoom lens system comprising in order from an object side to an image side:
   a first lens unit having positive optical power, the first lens unit moving so as to be closer to an object at a telephoto end than at a wide-angle end during zooming;
   a second lens unit having negative optical power, the second lens unit moving during zooming;
   a third lens unit having positive optical power, the third lens unit moving during zooming; and
   a fourth lens unit having positive optical power, the fourth lens unit moving in a locus convex toward the object side during zooming,
   wherein the zoom lens system satisfies the following conditions:

$0.5 < (\beta 3t \cdot \beta 4w)/(\beta 3w \cdot \beta 4t) < 0.9$, and $1.2 < \beta 4t/\beta 4w < 1.4$, where $\beta 3w$ is a lateral magnification of the third lens unit at the wide-angle end, $\beta 4w$ is a lateral magnification of the fourth lens unit at the wide-angle end, $\beta 3t$ is a lateral magnification of the third lens unit at the telephoto end, and $\beta 4t$ is a lateral magnification of the fourth lens unit at the telephoto end.

2. The zoom lens system according to claim 1, wherein the zoom lens system satisfies the following condition:

$0.35 < (|Mwm|+|Mwt|)/f3 < 0.60$, where Mwm is a moving distance of the fourth lens unit on an optical axis from the wide-angle end to a focal length fm, the focal length fm being defined as:

$fm = \sqrt{(fw \cdot ft)}$, where fw is a focal length of the zoom lens system at the wide-angle end, and ft is a focal length of the zoom lens system at the telephoto end; Mwt is a moving distance of the fourth lens unit from the wide-angle end to the telephoto end; and f3 is a focal length of the third lens unit.

3. The zoom lens system according to claim 1, wherein the zoom lens system satisfies the following condition:

$1.0 < |Mwm/Mwt| < 3.0$, where Mwm is a moving distance of the fourth lens unit on an optical axis from the wide-angle end to a focal length fm, the focal length fm being defined as:

$fm = \sqrt{(fw \cdot ft)}$, where fw is a focal length of the zoom lens system at the wide-angle end, and ft is a focal length of the zoom lens system at the telephoto end; and Mwt is a moving distance of the fourth lens unit from the wide-angle end to the telephoto end.

4. The zoom lens system according to claim 1, wherein the first lens unit includes, in order from the object side to the image side, a negative meniscus lens element with a convex surface at the object side, a positive lens element, and a positive lens element.

5. The zoom lens system according to claim 1, wherein the third lens unit includes two positive lens elements and a negative lens element.

6. The zoom lens system according to claim 1, wherein the zoom lens system satisfies the following condition:

$0.08 < (L3t-L3w)/ft < 0.20$, where ft is a focal length of the zoom lens system at the telephoto end, L3w is an axial distance between the third lens unit and the fourth lens unit at the wide-angle end, and L3t is an axial distance between the third lens unit and the fourth lens unit at the telephoto end.

7. The zoom lens system according to claim 1, wherein the zoom lens system satisfies the following condition:

$0.01 < |M3|/ft < 0.15$, where M3 is a moving distance of the third lens unit in an optical axis direction during zooming from the wide-angle end to the telephoto end, and ft is a focal length of the zoom lens system at the telephoto end.

8. The zoom lens system according to claim 1, wherein the third lens unit includes, in order from the object side to the image side, a positive lens element with a convex surface at the object side, a negative meniscus lens element with a convex surface at the object side, and a biconvex positive lens.

9. The zoom lens system according to claim 1, wherein the third lens unit includes, in order from the object side to the image side, a positive lens element with a convex surface at the object side, a negative meniscus lens element with a convex surface at the object side, and a cemented lens consisting of a negative meniscus lens element with a convex surface at the object side and a positive lens element.

10. The zoom lens system according to claim 1, wherein the third lens unit includes, in order from the object side to the image side, a positive lens element with a convex surface at the object side, a negative meniscus lens element with a convex surface at the object side, and a cemented lens consisting of a biconvex positive lens element and a biconcave negative lens element.

11. The zoom lens system according to claim 1, wherein the fourth lens unit is a single positive lens element or a cemented lens consisting of a positive lens element and a negative lens element.

12. The zoom lens system according to claim 1, wherein the third lens unit is moved so as to have a component in a direction perpendicular to an optical axis to compensate the position of a photographed image when the zoom lens system shakes.

13. The zoom lens system according to claim 1, wherein the zoom lens system forms an image on a solid-state image pickup element.

14. A camera comprising:
a zoom lens system according to claim 1; and
a solid-state image pickup element that detects an image formed by the zoom lens system.

* * * * *